United States Patent
Kuramoto et al.

(10) Patent No.: US 9,173,428 B2
(45) Date of Patent: Nov. 3, 2015

(54) METHOD FOR PRODUCING POWDERY EMULSIFIED FAT AND OIL

(75) Inventors: Takahiro Kuramoto, Souka (JP); Takehiko Watanabe, Souka (JP); Eichi Kikuchi, Hirakata (JP)

(73) Assignee: RIKEN VITAMIN CO., LTD., Tokyo (JP)

( * ) Notice: Subject to any disclaimer, the term of this patent is extended or adjusted under 35 U.S.C. 154(b) by 97 days.

(21) Appl. No.: 13/059,930

(22) PCT Filed: Aug. 18, 2009

(86) PCT No.: PCT/JP2009/064440
§ 371 (c)(1),
(2), (4) Date: Apr. 8, 2011

(87) PCT Pub. No.: WO2010/021322
PCT Pub. Date: Feb. 25, 2010

(65) Prior Publication Data
US 2011/0183060 A1    Jul. 28, 2011

(30) Foreign Application Priority Data

Aug. 22, 2008  (JP) .................................. 2008-213955

(51) Int. Cl.
| | | |
|---|---|---|
| A23D 9/007 | (2006.01) | |
| A23L 1/40 | (2006.01) | |
| A23D 7/005 | (2006.01) | |
| A23D 7/01 | (2006.01) | |
| A23D 9/05 | (2006.01) | |

(52) U.S. Cl.
CPC .................. *A23L 1/40* (2013.01); *A23D 7/0053* (2013.01); *A23D 7/011* (2013.01); *A23D 9/007* (2013.01); *A23D 9/05* (2013.01)

(58) Field of Classification Search
CPC ....... A23D 9/007; A23D 9/05; A23D 7/0053; A23D 7/011; A23L 1/24; A23L 1/40
USPC .......... 426/601, 607, 417, 650, 652, 443, 641
See application file for complete search history.

(56) References Cited

U.S. PATENT DOCUMENTS

| 3,348,954 | A | * | 10/1967 | Green ........................... 426/613 |
| 4,049,831 | A | * | 9/1977 | Ono et al. ....................... 426/72 |
| 5,487,909 | A | * | 1/1996 | Zabel et al. ................... 426/574 |

FOREIGN PATENT DOCUMENTS

| JP | 56-102766 | | * | 8/1981 | ................ A23L 1/24 |
| JP | 63042508 | A | | 2/1988 | |
| JP | 02027944 | A | | 1/1990 | |
| JP | 03-049649 | A | | 3/1991 | |
| JP | 07305088 | A | | 11/1995 | |
| JP | 2002325548 | A | | 11/2002 | |
| JP | 2003013090 | A | | 1/2003 | |
| JP | 2003049189 | A | | 2/2003 | |

OTHER PUBLICATIONS

Dictionary.com, "extract" definition. Oct. 19, 2012.*
Derwent abstract JP 56-102766. 1981.*
Aoyama JP56-102766, English Translation.*
International Search Report issued Sep. 29, 2009 in PCT Application No. PCT/JP2009/064440 filed Aug. 18, 2009.

* cited by examiner

*Primary Examiner* — Rena L Dye
*Assistant Examiner* — Lela S Williams
(74) *Attorney, Agent, or Firm* — Drinker Biddle & Reath LLP

(57) ABSTRACT

A method for producing a powdery emulsified fat and oil that releases fats and oils when dissolved in hot water and that has an excellent powder property during storage is provided. The method for producing a powdery emulsified fat and oil includes adding a fat and oil to an aqueous solution containing a meat extract and a salt and emulsifying the mixture, and then drying the emulsified solution. The method for producing a powdery emulsified fat and oil includes emulsifying the aqueous solution that further contains an excipient and then drying the emulsified solution. A powdered soup produced using the obtained powdery emulsified fat and oil has a good aroma and richness, and is provided as a food product with an excellent shelf life.

4 Claims, No Drawings

METHOD FOR PRODUCING POWDERY EMULSIFIED FAT AND OIL

CROSS REFERENCE TO RELATED APPLICATIONS

This application is the National Stage of International Application No. PCT/JP2009/064440 filed Aug. 18, 2009, and claims benefit of Japanese Patent Application No. 2008-213955 filed Aug. 22, 2008 which are herein incorporated by reference in their entirety.

TECHNICAL FIELD

The present invention relates to a method for producing a powdery emulsified fat and oil.

BACKGROUND ART

Fat and oil is added to powder products such as a powdered soup in order to give richness and aroma to them. Methods of adding fat and oil include a method of packing fat and oil separately from other ingredients, a method of adding a small amount of fat and oil to for example, a powdered soup, a method of allowing a powdery base to absorb fat and oil, and the like. When the powdered soup produced using these methods is dissolved in, for example, hot water, oil droplets float to the surface of the soup, thus giving rise to a pleasant aroma. In contrast, when a powdery emulsified fat and oil that is obtained by emulsifying fat and oil and an aqueous phase to produce an oil-in-water emulsion and then drying the emulsion is added to a powdered soup, it remains emulsified in the soup and gives a creamy texture and richness; however, oil droplets do not float to the surface of the soup, thus giving rise to no pleasant aroma.

Conventionally known powdery fats and oils that produce oil droplets floating to the surface of the soup include: a method for producing a powdered soup including heating a powdery system consisting of powdery saccharides or powder composed principally of saccharides and water under a heating condition that the saccharides crystallize to produce porous particles in an indeterminate form, adding liquid fat and oil to the particles and mixing them, and subsequently mixing the mixture with various ingredients for the powdered soup (Patent Literature 1); a powdery fat and oil for a soup that is produced by mixing 30 to 70% by weight of hydrogenated fat and oil based on the total weight of the product, with the hydrogenated fat and oil being powdery at normal temperatures, and a powder obtained by allowing porous starch to absorb 70 to 120% by weight of fat and oil based on the weight of the porous starch (Patent Literature 2); a method for producing a fat and oil-containing powdery saccharide including mixing 10 to 35 parts by mass of melted fat and oil obtained by heating a fat and oil with an initial melting point of 40 to 60° C. with 100 parts by mass of powdery saccharides (Patent Literature 3); and the like.

Furthermore, disclosed powdery fats and oils include, for example, a powdery fat and oil that meets the following conditions (1) to (3):
(1) that is produced by using a fat and oil with an initial melting point of 40 to 60° C.;
(2) that contains substantially no emulsifier; and
(3) that has a particle size distribution as follows: 10 to 55% by mass of particles pass through an aperture of 1840 μm and remain on an aperture of 850 μm; 35 to 85% by mass of particles pass through the aperture of 850 μm and remain on an aperture of 300 μm; and 5 to 30% by mass of particles pass through the aperture of 300 μm and remain on an aperture of 106 μm (Patent Literature 4).

However, the above-mentioned powdery fats and oils have a poor powder property during storage and are practically problematic.

[Patent Literature 1] Japanese Patent Application Laid-Open No. Sho 63-42508
[Patent Literature 2] Japanese Patent Application Laid-Open No. Hei 2-27944
[Patent Literature 3] Japanese Patent Application Laid-Open No. 2002-325548
[Patent Literature 4] Japanese Patent Application Laid-Open No. 2003-13090

DISCLOSURE OF THE INVENTION

Problems to be Solved by the Invention

In view of the above circumstances, it is an object of the present invention to provide a method for producing a powdery emulsified fat and oil that releases fats and oils when dissolved in hot water and that has an excellent powder property during storage.

Means for Solving the Problems

As a result of dedicated research to solve the above-mentioned problems, the present inventors have found that a powdery emulsified fat and oil that was produced by using a meat extract as a powdering agent in conjunction with common salt releases fats and oils when dissolved in hot water. The present inventors carried on further research based on this finding and thus accomplished the present invention.

Therefore, the present invention includes:
(1) a method for producing a powdery emulsified fat and oil including: adding a fat and oil to an aqueous solution containing a meat extract and a salt and emulsifying the mixture, and then drying the emulsified solution, and
(2) the method for producing a powdery emulsified fat and oil according to (1), wherein the aqueous solution further includes an excipient in addition to the meat extract and the salt.

Effects of the Invention

The powdery emulsified fat and oil obtained by the producing method provided by the present invention has the advantage that it releases a part of the fat and oil when dissolved in hot water and provides a pleasant aroma, and additionally it has an excellent powder property during storage.

BEST MODE FOR CARRYING OUT THE INVENTION

The powdery emulsified fat and oil provided by the present invention is, in its basic embodiment, obtained by adding a fat and oil to an aqueous solution containing a meat extract and a salt and emulsifying the mixture, and then drying the emulsified solution.

The meat extract used in the present invention is preferably one obtained by heating and extracting a material containing meat and/or bones of livestock with a solvent such as water. Commercially available meat extracts can also be used.

Livestock used may be any livestock. For example, pigs, cows, chickens, and the like are preferably used.

Materials containing meat and/or bones include, for example, unboned meat obtained by dividing a carcass after slaughter of livestock with e.g., a saw (referred to as "dressed carcass" hereinbelow), dressed meat, and a bone with adhering meat, which is a by-product in producing dressed meat from the dressed carcass, (referred to as "bone with meat" hereinbelow). These may be combined and used.

Although the parts of dressed meat are not particularly limited, for example, when the material is pork, examples of dressed meat include pork shoulder, boston butt, pork loin, tenderloin, pork side, leg, pork bottom round, and the like. When the material is beef, examples of dressed meat include beef neck, beef clod, chuck eye roll, rib roast, sirloin, tenderloin, flank, round, bottom round, rump, shank, and the like. When the material is chicken, examples of dressed meat include breast, thigh, chicken tender, and the like. Examples of bones with meat include those from a pig, a cow, a chicken, and the like.

Extractants used in the present invention are not particularly limited as long as they are aqueous media. Water is preferably used, and aqueous solutions containing mineral salts, ethanol, and the like may also be used.

The amounts of an extractant and a material containing meat and/or bones of livestock may be selected as appropriate depending on the material, the extract method and the like; however, for example, about 50 to 1000 parts by mass, preferably about 100 to 300 parts by mass of the extractant is used relative to 100 parts by mass of the material.

The extraction temperature for the meat extract used in the present invention is about 98 to 150° C., preferably about 98 to 135° C., and more preferably about 105 to 130° C., in view of presentation of a good flavor.

If the extraction temperature is lower than about 98° C., meat extract produced has a stronger bloody smell in its flavor, resulting in a poor flavor of the powdery emulsified fat and oil produced using the meat extract. If the extraction temperature is higher than about 150° C., meat extract produced has a burnt smell, resulting in a poor flavor of the powdery emulsified fat and oil produced using the meat extract.

Although extraction time may be of any length as long as it is long enough for extracting meat extract from a material, the extraction time is about 1 to 48 hours, preferably about 1.5 to 24 hours, and more preferably about 2 to 12 hours.

Any extraction apparatus may be used for extracting meat extract as long as the extract can be extracted from the material using the apparatus. For example, heating apparatuses such as an atmospheric pressure oven, an autoclave, and a hot kneader are included. Insoluble solids are removed after the extraction procedure to obtain the extracted liquid. The insoluble solids can be removed by general solid-liquid separation methods such as sedimentation by standing or centrifugation, or cake filtration, clarifying filtration, or centrifugal filtration to obtain the extracted liquid. The above-mentioned extracted liquid may contain contaminated fat that was generated at the time of extraction; however, it is preferable to separate and remove the fat by using, for example, a three-layer separator at the time of solid-liquid separation.

Although means for concentrating the obtained extracted liquid may be any method such as heat concentration, reverse osmosis concentration, vacuum concentration, and freeze concentration, vacuum concentration is preferably used in view of quality and cost. A concentration rate is not particularly limited; however, the solid content in the concentrate is preferably about 50% or less, since an increased concentration rate leads to an increased viscosity, resulting in reduced operational efficiency.

The solid content in the meat extract can be calculated by subtracting the water content from the mass of the meat extract. The water content is measured by a heat-drying method under atmospheric pressure (105° C., 3 hours of drying).

The amount of the meat extract (as a solid) contained in 100% by mass of the powdery emulsified fat and oil of the present invention is about 3 to 49.4% by mass, preferably about 5 to 45% by mass, and more preferably about 10 to 40% by mass. A content less than 3% by mass may cause caking during storage. A content more than 49.4% by mass is unfavorable because of a relatively low content of oil and fat in the powdery emulsified fat and oil.

As used in the present invention, the content of the meat extract (as a solid) represents an amount that is contained in 100% by mass of the powdery emulsified fat and oil in terms of solid content.

Salts used in the present invention include common salt, wet salt, salt with less water content, refined salt, rock salt, solar salt, and the like.

The amount of the salt contained in 100% by mass of the powdery emulsified fat and oil of the present invention is about 0.5 to 30% by mass, preferably about 0.5 to 20% by mass, and more preferably about 1 to 10% by mass. A content less than about 0.5% by mass is unfavorable since it is difficult for the powdery emulsified fat and oil to release fats and oils when dissolved in hot water. A content more than about 30% by mass may cause caking during storage.

As used in the present invention, the content of the salt represents an amount that is contained in 100% by mass of the powdery emulsified fat and oil in terms of solid content.

Fats and oils used in the present invention include edible fats and oils, for example, animal fats and oils such as beef tallow, lard, chicken fat, and fish oil, and hydrogenated oils thereof; vegetable oils such as soybean oil, sesame oil, peanut oil, corn oil, rapeseed oil, coconut oil, and palm oil, and hydrogenated oils thereof; flavored oil to which aromas derived from, for example, aromatic vegetables, spices, and fish and shellfish were added; and the like. These may be used alone or as a mixture of two or more thereof.

The amount of the fat and oil contained in 100% by mass of the powdery emulsified fat and oil of the present invention is about 50 to 85% by mass, preferably about 50 to 80% by mass, and more preferably about 50 to 75% by mass in 100% by mass of the powdery emulsified fat and oil.

As used in the present invention, the content of the fat and oil represents an amount that is contained in 100% by mass of the powdery emulsified fat and oil in terms of solid content.

Excipients used in the present invention include saccharides, starches, polysaccharide thickeners and gums, and the like. Examples of saccharides include glucose, fructose, maltose, lactose, sucrose, dextrin, corn syrup, and the like. Examples of starches include cornstarch, potato starch, wheat starch, tapioca starch, and modified starches thereof (esterified starch, etherified starch, cross-linked starch, oxidized starch, acid treated starch, heat-moisture treated starch, etc.), and the like. Examples of polysaccharide thickeners and gums include xanthan gum, locust bean gum, tragacanth gum, gum arabic, pectin, and the like. These may be used alone or as a mixture of two or more thereof. Preferably, dextrin is used.

The amount of the excipient contained in 100% by mass of the powdery emulsified fat and oil of the present invention is about 0 to 46.4% by mass, preferably about 1 to 35% by mass, and more preferably about 2 to 25% by mass.

As used in the present invention, the content of the excipient represents an amount that is contained in 100% by mass of the powdery emulsified fat and oil in terms of solid content.

The powdery emulsified fat and oil provided by the present invention may contain any other ingredients as long as they do not impair the object of the present invention. Examples of such ingredients include an antioxidant, seasoning, spice, an emulsifier, and the like.

Examples of an emulsifier include sorbitan fatty acid esters.

The method for producing the powdery emulsified fat and oil provided by the present invention may include adding a fat and oil to an aqueous solution containing a meat extract and a salt and emulsifying the mixture, and then drying the emulsified solution.

A specific method for producing the powdery emulsified fat and oil is exemplified below.

For example, a meat extract and a salt are added to water and dispersed or dissolved in the water by heating to about 50 to 80° C., preferably to 60 to 70° C. to prepare an aqueous phase. An oil-in-water emulsion is produced by adding a fat and oil that was heated to about 50 to 80° C., preferably to about 60 to 70° C. to the aqueous phase under stirring and emulsifying the mixture.

Apparatuses used for emulsifying the fat and oil and the aqueous phase as described above are not particularly limited. For example, ordinal stir-mixing baths equipped with, for example, a mixer, a jacket for heating, and a baffle plate can be used. The equipped mixer is preferably a high-speed homogenizer such as T.K. HOMO MIXER (PRIMIX Corporation) or CLEARMIX (M Technique Co., Ltd.). An exemplary emulsification condition in using the homogenizer is stirring at the number of revolutions of about 6000 to 20000 rpm for about 10 to 60 minutes, for example, when the homogenizer is a small device for laboratory use.

The oil-in-water emulsion may be further homogenized or sterilized if desired.

A powdery emulsified fat and oil can be obtained by drying the produced oil-in-water emulsion. The water content of the obtained powdery emulsified fat and oil is preferably 5% or less in view of retention of quality. Apparatuses used for drying the above-mentioned oil-in-water emulsion are not particularly limited. For example, a spray dryer, a drum dryer, a vacuum dryer, and the like may be used. Preferably, a spray dryer is used. An exemplary drying condition in using the spray dryer is drying at an inlet air temperature of about 160 to 180° C. and an exhaust air temperature of about 80 to 100° C., for example, when the spray dryer is a small device for laboratory use.

The powdery emulsified fat and oil provided by the present invention is suitably used for seasoning powders such as a powdered soup and a powdered sauce. Although the amount varies depending on products and purposes, for example, the inventive powdery emulsified fat and oil may be included in the amount of 1 to 50% by mass in a product.

EXAMPLES

Hereinbelow, the present invention will be described in detail with reference to Examples, Comparative Examples, and Application Examples, but the present invention is not intended to be limited thereto in any way.

[Production of Meat Extract: Pork Extract]

200 kg of water and 100 kg of pig-derived bones with meat were placed into an autoclave (model: RCS-180/20S; manufactured by Hisaka Sakuseisho) and were subjected to extraction with hot water at 115° C. for 4 hours. After extraction, a centrifugal filter (model: MP-5PY-1; manufactured by TOMOE Engineering Co., Ltd.) was used to separate an aqueous phase and a fat and oil phase. Solids included in the aqueous phase were 4% by mass.

Parts of the aqueous phase (about 50 kg: 2 kg×25 times) were concentrated at 55° C. for about 2 hours using an evaporator (model: N-1000; manufactured by Tokyo Rikakiki Sha) to produce about 5 kg of pork extract (trial product 1) having 35% by mass of the solid.

[Production of Meat Extract: Beef Extract]

200 kg of water and 100 kg of cow-derived bones with meat were placed into the autoclave (model: RCS-180/20S; manufactured by Hisaka Sakuseisho) and were subjected to extraction with hot water at 115° C. for 4 hours. After extraction, the centrifugal filter (model: MP-5PY-1; manufactured by TOMOE Engineering Co., Ltd.) was used to separate an aqueous phase and a fat and oil phase. Solids included in the aqueous phase were 4% by mass.

Parts of the aqueous phase (about 50 kg: 2 kg×25 times) were concentrated at 55° C. for about 2 hours using the evaporator (model: N-1000; manufactured by Tokyo Rikakiki Sha) to produce about 5 kg of beef extract (trial product 2) having 35% by mass of the solid.

[Production of Powdery Emulsified Fat and Oil]

(1) Ingredients:

Lard (product name: Porkoil G; manufactured by Riken Vitamin Co., Ltd.)

Beef tallow (product name: mz Beef oil A; manufactured by Maruzen Food Industry Co., Ltd.)

Pig extract (trial product 1, solid content of 35%)

Beef extract (trial product 2, solid content of 35%)

Common salt (product name: common salt; manufactured by Naikai Salt Industries Co., Ltd.)

Dextrin (product name: PINEDEX 2; manufactured by Matsutani Chemical Industry Co., Ltd.)

Emulsifier (product name: Poem SMV-302; manufactured by Riken Vitamin Co., Ltd.)

(2) Mixing Proportions of Oil-in-Water Emulsion and Powdery Emulsified Fat and Oil After production of an oil-in-water emulsion, spray drying was performed to produce a powdery emulsified fat and oil.

The mixing proportions for the oil-in-water emulsion produced using the above-mentioned ingredients are shown in Table 1. The mixing proportions of Examples are shown as Examples 1 to 4, and the mixing proportion of Comparative Example is shown as Comparative Example 1.

TABLE 1

| | | Examples | | | | Comparative Example |
|---|---|---|---|---|---|---|
| | Feed | 1 | 2 | 3 | 4 | 1 |
| Fat And oil | Lard | 410.0 | 350.0 | — | 350.0 | 350.0 |
| | Beef tallow | — | — | 350.0 | — | — |
| Aqueous phase | Pork extract | 700.0 | 250.0 | — | 250.0 | 250.0 |
| | Beef extract | — | — | 250.0 | — | — |
| | Common salt | 140.0 | 20.0 | 16.0 | 20.0 | 0.0 |
| | Dextrin | — | 80.0 | 80.0 | 80.0 | 80.0 |
| | Emulsifier | — | — | — | 4.0 | — |
| | Water | 400.0 | 400.0 | 450.0 | 400.0 | 400.0 |
| | Feed | 1650.0 | 1100.0 | 1146.0 | 1104.0 | 1080.0 |

The unit of the above-mentioned table is grams (g).

(3) Production of Oil-in-Water Emulsion

An oil-in-water emulsion was produced on the basis of the mixing proportions shown in Table 1.

The ingredients listed in the aqueous phase section of Table 1 were mixed together and the solution temperature was brought to 65° C. Subsequently, the solution was agitated using T. K. HOMO MIXER (model: MARK II, manufactured by PRIMIX Corporation) at 7000 rpm for 1 minute to prepare a homogeneous aqueous phase. Then, the aqueous phase was agitated at 7000 rpm while a fat and oil was added. After addition of the fat and oil, the mixture was agitated at 10000 rpm for 20 minutes to produce an oil-in-water emulsion.

(4) Production of Powdery Emulsified Fat and Oil

The obtained oil-in-water emulsion was spray-dried (an inlet air temperature of 180° C.) using a spray drier (model: L-8i, manufactured by Ohkawara Kakohki Co., Ltd.) to produce a powdery emulsified fat and oil.

The ratio of feed of the ingredients (the amount of the meat extract is in terms of solid content) for the powdery emulsified fats and oils is shown in Table 2. Furthermore, the water contents of the powdery emulsified fats and oils measured by a heat-drying method under atmospheric pressure (105° C., 2 hours of drying) are shown in Table 3.

TABLE 2

|   | Amount of fat and oil | Solid content derived from meat extract | Amount of common salt | Amount of dextrin | Amount of emulsifier |
| --- | --- | --- | --- | --- | --- |
| Example 1 | 51.6 | 30.8 | 17.6 | — | — |
| Example 2 | 65.1 | 16.3 | 3.7 | 14.9 | — |
| Example 3 | 65.5 | 16.4 | 3.0 | 15.0 | — |
| Example 4 | 64.6 | 16.2 | 3.7 | 14.8 | 0.7 |
| Comparative Example 1 | 67.6 | 16.9 | 0.0 | 15.5 | — |

The unit of the above table is % by mass.

TABLE 3

|   | Water content |
| --- | --- |
| Example 1 | 1.5 |
| Example 2 | 1.6 |
| Example 3 | 1.8 |
| Example 4 | 1.7 |
| Comparative Example 1 | 1.6 |

The unit of the above table is percent (%).

[Evaluation 1 of Powdery Emulsified Fat and Oil: Generation of Oil Droplets and Aroma]

100 mL of hot water at about 95° C. was charged to a 300 mL beaker. 5 g of one of the obtained powdery emulsified fats and oils (selected from the products from Examples 1 to 4 and the product from Comparative Example 1) was added to the beaker while stirring at about 60 rpm using a magnetic stirrer (model: SR-350, manufactured by Advantec Toyo Kaisha, Ltd.) and a 6 cm stirring bar. After the powdery emulsified fat and oil was dispersed by stirring for about 30 seconds, the state of the oil droplet generation was visually identified on the basis of the evaluation criteria described in Table 4. Sensory evaluation of aroma was performed by panelists in a total number of 20 consisting of 10 men and 10 women. Results are shown as averages of the scores by the 20 panelists and were symbolized according to the criteria described in Table 5.

TABLE 4

| Evaluation category | Evaluation criteria | Scores |
| --- | --- | --- |
| Generation of oil droplets | Small oil droplets are generated and a pleasant aroma arises. | 4 |
|  | Some small oil droplets are generated and a pleasant aroma arises. | 3 |
|  | Although small oil droplets are generated only in a small area, no pleasant aroma arises. | 2 |
|  | No small oil droplets are generated and no pleasant aroma arises. | 1 |

TABLE 5

| ⊚: Very good | The mean value of scores is 3.5 or more. |
| --- | --- |
| ◯: Good | The mean value of scores is 2.5 to 3.4. |
| Δ: Slightly bad | The mean value of scores is 1.5 to 2.4. |
| X: Bad | The mean value of scores is 1.4 or less. |

[Evaluation 2 of Powdery Emulsified Fat and Oil: Powder Property]

50 g of the obtained powdery emulsified fat and oil was placed and sealed in a plastic bag (10 cm×15 cm), and stored in an incubator (40° C.) for 2 weeks. Then, the powder property was evaluated on the basis of the evaluation criteria described in Table 6.

TABLE 6

| Evaluation category | Evaluation | | Evaluation criteria |
| --- | --- | --- | --- |
| Powder property | ⊚ | Very good | No aggregation of powders occurs, and powdery texture is provided. |
|  | ◯ | Good | Although a certain amount of aggregation of powders occurs, lumps crumble easily. |
|  | Δ | Slightly bad | Powders aggregate. Lumps do not crumble easily. |
|  | X | Bad | The whole powder aggregates and caking occurs. |

The results from evaluations 1 and 2 of the powdery emulsified fats and oils are shown together in Table 7.

TABLE 7

|   | Generation of oil droplets | Powder property |
| --- | --- | --- |
| Product from Example 1 | ◯ | ◯ |
| Product from Example 2 | ⊚ | ⊚ |
| Product from Example 3 | ⊚ | ⊚ |
| Product from Example 4 | ⊚ | ⊚ |
| Product from Comparative Example 1 | X | ⊚ |

As is found from the results, the scores of the products from Examples 1 to 4 were very good or good in both categories, that is, generation of oil droplets and a powder property. On the other hand, the score of the product from Comparative Example 1 was bad in the category of generation of oil droplets.

Application Example 1

Powdered Soup

Powdered soup 1 was obtained by placing ingredients in a plastic bag according to the following mixing proportion of the ingredients for the powdered soup and shaking up the bag: a powdery emulsified fat and oil (the product from Example 2, 25 parts by mass), common salt (26 parts by mass), chicken extract powder (25 parts by mass), sodium glutamate (10 parts by mass), sugar (8 parts by mass), onion powder (5 parts by mass), and pepper powder (1 part by mass). Powdered soup 2 was obtained similarly, except that a powdery emulsified fat and oil (the product from Comparative Example 1) was used instead of the powdery emulsified fat and oil (the product from Example 2).

150 g of boiling water was poured onto 5 g of each of the powdered soups and stirred thoroughly to produce soup.

Application Example 2

Powdered Soup for Instant Noodle

Powdered soup for an instant noodle 1 was obtained by placing ingredients in a plastic bag according to the following mixing proportion of the ingredients for the powdered soup for an instant noodle and shaking up the bag: a powdery emulsified fat and oil (the product from Example 2, 30 parts by mass), common salt (32 parts by mass), sodium glutamate (13 parts by mass), sugar (10 parts by mass), chicken extract powder (8 parts by mass), scallop extract powder (3 parts by mass), squid extract powder (2 parts by mass), pepper powder (1 part by mass), and ginger powder (1 part by mass).

Powdered soup for an instant noodle 2 was obtained similarly, except that a powdery emulsified fat and oil (the product from Comparative Example 1) was used instead of the powdery emulsified fat and oil (the product from Example 2).

90 g of dried noodle was added to 10 g of each of the powdered soups for an instant noodle, and 350 g of boiling water was poured thereon. The mixture was stirred thoroughly to produce an instant noodle.

Application Example 3

Powdered Thick Soup

Powdered thick soup 1 was obtained by placing ingredients in a plastic bag according to the following mixing proportion of the ingredients for the powdered thick soup and shaking up the bag: a powdery emulsified fat and oil (the product from Example 2, 20 parts by mass), corn powder (30 parts by mass), whole milk powder (13 parts by mass), common salt (12 parts by mass), sodium glutamate (10 parts by mass), sugar (10 parts by mass), onion powder (4 parts by mass), pepper powder (0.7 parts by mass), and laurel leaf powder (0.3 parts by mass). Powdered thick soup 2 was obtained similarly, except that a powdery emulsified fat and oil (the product from Comparative Example 1) was used instead of the powdery emulsified fat and oil (the product from Example 2).

500 g of water was poured onto 50 g of each of the powdered thick soups and stirred under heat to produce thick soup.

Application Example 4

Instant Powdered Stew

Instant powdered stew 1 was obtained by placing ingredients in a plastic bag according to the following mixing proportion of the ingredients for the instant powdered stew and shaking up the bag: a powdery emulsified fat and oil (the product from Example 2, 40 parts by mass), whole milk powder (20 parts by mass), sugar (10 parts by mass), cheese powder (9 parts by mass), common salt (7 parts by mass), sodium glutamate (5 parts by mass), onion powder (4 parts by mass), corn starch (3 parts by mass), and celery powder (2 parts by mass). Instant powdered stew 2 was obtained similarly, except that a powdery emulsified fat and oil (the product from Comparative Example 1) was used instead of the powdery emulsified fat and oil (the product from Example 2).

3 g of dried carrot, 3 g of dried pumpkin, and 3 g of dried broccoli were added as ingredients to 100 g of each of the instant powdered stews. After 600 g of boiling water was poured onto the mixture, the mixture was stirred thoroughly to produce instant stew.

Food products produced in Application Examples 1 to 4 were evaluated on the basis of the evaluation criteria described below.

A: Good flavor (plenty of aroma and richness is detected)
B: Slightly good flavor (moderate aroma and richness is detected)
C: Slightly bad flavor (no enough aroma and richness is detected)
D: Bad flavor (little aroma and richness is detected)

The results are shown in Table 8.

TABLE 8

| | | Powdered fat and oil compositions used | |
| --- | --- | --- | --- |
| | Name of food products | Product from Example 2 | Product from Comparative Example 1 |
| Application Example 1 | Powdered soup | A | D |
| Application Example 2 | Powdered soup for instant noodle | A | D |
| Application Example 3 | Powdered thick soup | A | C |
| Application Example 4 | Instant powdered stew | A | C |

The food products that included the powdery emulsified fat and oil produced in Examples had a good flavor. The food products that included the powdery emulsified fat and oil produced in Comparative Example had a slightly bad or bad flavor.

INDUSTRIAL APPLICABILITY

As described above, the present invention provides a method for producing a powdery emulsified fat and oil that releases a part of the fat and oil when dissolved in hot water and provides a pleasant aroma and that has an excellent powder property during storage.

The powdered soup produced using the obtained powdery emulsified fat and oil has a good aroma and richness, and is provided as a food product with an excellent shelf life.

The invention claimed is:
1. A method for producing a powdery emulsified fat and oil comprising:
  extracting a material containing meat or bones, or a combination thereof, of livestock with an aqueous media at a temperature from 98 to 150° C., and removing insoluble solids to form a meat extract;
  adding 50 to 85% by mass of fat and oil to an aqueous solution containing 3 to 49.4% by mass of the meat extract, and 0.5 to 30% by mass of salt, each based on 100% by mass of the emulsified fat and oil, in which the aqueous solution does not contain an emulsifier, or contains a sorbitan fatty acid ester as an emulsifier; and emulsifying the mixture at a temperature from 50 to 80° C.; and then drying the emulsified solution to form the powdery emulsified fat and oil.

2. The method for producing a powdery emulsified fat and oil according to claim 1, wherein the aqueous solution further includes an excipient in addition to the meat extract and the salt.

3. A seasoning powder containing a powdery emulsified at and oil produced by the method according to claim 1.

4. A seasoning powder containing a powdery emulsified fat and oil produced by the method according to claim 2.

* * * * *